Nov. 18, 1924.

W. A. THUM 1,516,253

COMBINED FENDER AND BUMPERS FOR AUTOMOBILES

Filed April 7, 1924

INVENTOR
Walter A. Thum.

ATTORNEY

Patented Nov. 18, 1924.

1,516,253

UNITED STATES PATENT OFFICE.

WALTER A. THUM, OF ST. LOUIS, MISSOURI, ASSIGNOR TO ADRIAN J. ESKELES, OF ST. LOUIS, MISSOURI.

COMBINED FENDER AND BUMPERS FOR AUTOMOBILES.

Application filed April 7, 1924. Serial No. 704,777.

*To all whom it may concern:*

Be it known that I, WALTER A. THUM, a citizen of the United States, residing at the city of St. Louis, State of Missouri, have invented a certain new and useful Combined Fender and Bumper for Automobiles, of which the following is a specification, reference being had to the accompanying drawings, forming a part thereof.

This invention relates to a certain new and useful combined fender and bumpers, especially adapted for automibiles.

My invention has for its chief object the provision for and in connection with an automobile of efficient safety means, whereby the now great loss of life and personal injuries resulting from the increasing use of automobiles may be, if not entirely obviated, greatly lessened and reduced.

With the above and other objects in view, my present invention resides in the provision for automobiles of safety means in the form preferably of a swingable fender or in the form of a combined pair of fixed bumper-guards and an intermediate swingable fender, and in the novel features of form, construction, arrangement, and combination of parts hereinafter described and pointed out in the claims.

In the accompanying drawing.

Figure 1:
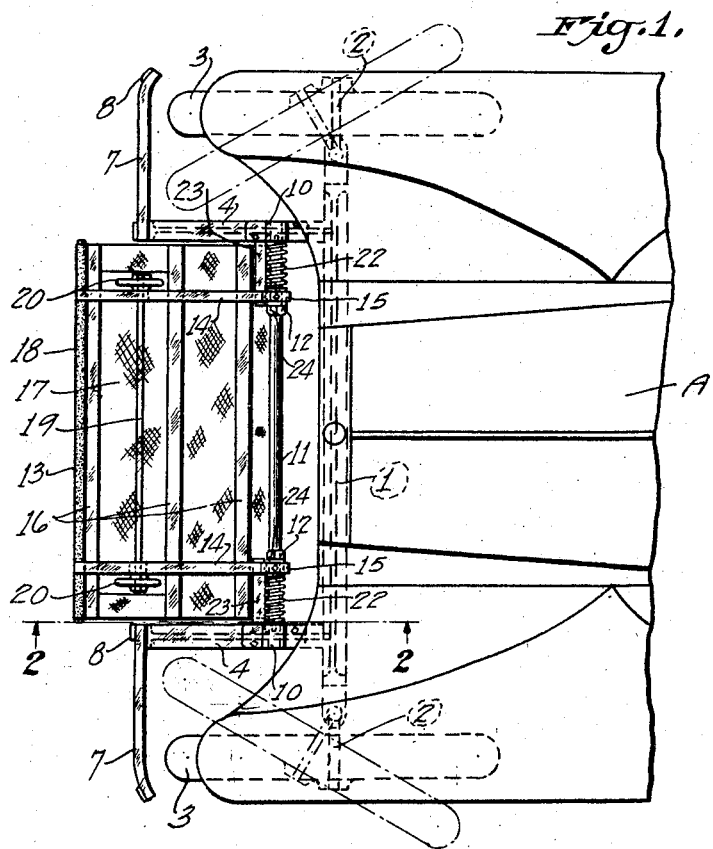
Figure 1 is a fragmental plan view of an automobile equipped with a combined fender and bumpers embodying my invention.

Referring now more in detail and by reference characters to the drawing, which illustrates a preferred embodiment of my invention, A designates an automobile of standard type, of which 1 is the front axle, 2—2 the steering-spindles, and 3—3 the front-wheels.

Figure 2:
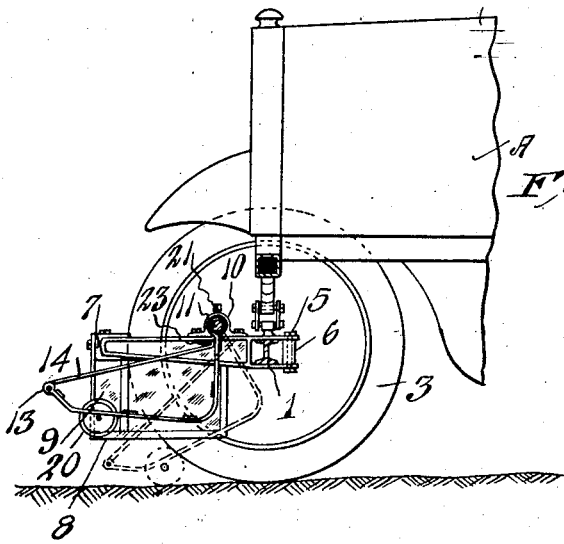
Figure 2 is a view taken approximately on the line 2—2, Figure 1.

Projecting forwardly from axle 1 intermediate the wheels 3, is a pair of suitably spaced approximately parallel combined-fender and bumper supporting-members 4—4, which are preferably castings beam-shaped in cross-section, and which at their rear ends straddle axle 1, as best seen in Figure 2, the beams or supports 4 being suitably rigidly fixed to the axle 1, as by means of through-bolts 5 and spacing-collars 6, as shown.

Bolted or otherwise rigidly fixed at their inner ends to the forward or outer ends of, and projecting, in advance or forwardly of the wheels 3, outwardly or laterally from, the respective beams or supports 4, are oppositely-disposed members or bars 7—7, which form the bumpers proper; and depending in the vertical plane of, and supported by, the beams 4 and bumper-bars 7, are suitable guard-frames 8 each having a body of suitable mesh material 9.

Figure 3:
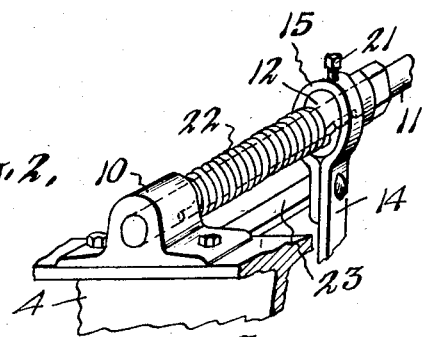
Figure 3 is an enlarged fragmental perspective view of the fender-supporting-shaft and some of its associated parts.

Extending in approximately parallel relation with axle 1 and supported at its ends in suitable bearing-blocks 10, 10, disposed upon the beams 4 adjacent their rear or inner ends, is a shaft 11, sleeved upon which adjacent its ends are collars 12; and suspended by shaft 11 for swinging or pivotal movement intermediate the bumper-bars 7, is a so-called open basket 13 having preferably the form or shape in plan and end elevation best seen in Figures 1 and 2, respectively, the basket 13 including a pair of suitably spaced end-frames or hangers 14 having eyes 15 engaging around the collars 12, as best seen in Figure 3, cross or frame-connecting members or slats 16, and a body of suitable mesh material 17, the forward end or nose of the basket 13 being suitably cushioned, as at 18. Supported by and disposed under the hanger-frames 14 adjacent the nose of the basket 13, is a shaft or so-called axle 19, mounted for rotation upon which are suitable rollers or wheels 20, 20.

As best seen in Figure 3, the hanger-frames 14 at their eyes 15 are suitably secured, as by screws or the like 21, to the shaft-collars 12, and coiled on the shaft 11 and engaging at one end with the bearing-blocks 10 and at their other end with the collars 12, are springs 22 that normally function to yieldingly hold the basket 13 in an elevated or in an obliquely forwardly presented position, or in the position thereof illustrated in full lines in Figure 2, with its nose 18 somewhat in advance or forwardly of the bumpers 7, such elevated or raised position of the basket 13 under the pull or tension of the springs 22 being limited and controlled by short-bars 23 fixed at an end to the beams 4 and oppositely-projecting inwardly for engagement by the hanger-frames 14.

In use and operation, it will be evident that the basket 13, on engaging a person or other obstruction, will, under such weight and against the pull of the springs 22, be tilted or swingably forced downwardly and rearwardly, or into the position thereof illustrated in dotted lines in Figure 2, the rollers 20 limiting, on engaging the ground-surface, such rearward and downwardly swung or tilted position of the basket and, at the same time, enabling the automobile to continue in motion or travel without breakage of parts. Should such person or obstruction be engaged or struck by the bumper-bars 7, the impact would naturally throw the person either to the side of the automobile or into the basket, where, in the latter event, the person is safely carried along without injury until the automobile comes to a stop, the depending guard or bumper-frames 8 protecting the person from injury by the wheels of the car. Thus my new fender and bumpers, which are relatively simple and inexpensive in form and construction and readily installed upon the automobile function in the avoidance and the elimination and reduction of injury resulting from accidents and collisions. I may add that by means of their preferably hexagonal or nut-shaped portions 24, the collars 12 may be rotarily actuated on the shaft 11 and the tension or pull of the springs 22 upon the basket 13 regulated or adjusted accordingly, under the pull of which springs the basket 13 will automatically return to normal elevated position on the removal of the picked-up person or other obstruction.

I am aware that changes in the form, construction, arrangement, and combination of the several parts of my new fender and bumpers or guards may be made and substituted for those herein shown and described without departing from the nature and principle of my invention.

Having thus described my invention, what I claim and desire to secure by Letters Patent is:

1. An automobile fender comprising, in combination, a basket including hangers, means including a shaft having engagement with the hangers and springs having engagement with the shaft and hangers for yieldingly supporting the basket for swinging movement under engagement with an obstruction, and rollers carried by the basket for engagement with the ground-surface for limiting the swung position of the basket on engagement with the obstruction without impeding travel of the automobile.

2. In combination with an automobile, including its frame, beams projecting forwardly from the frame, a shaft supported by the beams, a basket including hangers depending for swinging movement from the shaft, coiled springs having engagement with the shaft and hangers for yieldingly maintaining the basket in elevated position for engagement with an obstruction, and rollers carried by the basket for engagement with the ground-surface for limiting the swung position of the basket on engagement with the obstruction without impeding travel of the automobile.

3. In combination with an automobile, including its frame, beams projecting forwardly from the frame, a shaft supported by the beams, a basket including hangers depending for swinging movement from the shaft, coiled springs having engagement with the shaft and hangers for yieldingly maintaining the basket in elevated position for engagement with an obstruction, rollers carried by the basket for engagement with the ground-surface for limiting the swung position of the basket on engagement with the obstruction without impeding travel of the automobile, and bars projecting from said beams for engagement with the hangers for limiting the elevated position of the basket under the pull of the springs.

4. In combination with an automobile, of a pair of spaced rigid bumpers, and a fender comprising a basket yieldingly supported upon the automobile for swinging movement intermediate the bumpers.

5. In combination with an automobile, including its front wheels and frame, of a pair of spaced beams supported by and projecting forwardly from the frame, bumper-bars projecting laterally from said beams and disposed forwardly of the wheels, and a basket yieldingly supported by the beams for swinging movement intermediate the bumpers.

6. In combination with an automobile, including its front wheels and frame, of a pair of spaced beams supported by and projecting forwardly from the frame, bumper-bars projecting laterally from said beams and disposed forwardly of the wheels, a basket yieldingly supported by the beams for swinging movement intermediate the bumpers, and guards depending from the beams and bumper-bars and disposed at the ends of the basket.

In testimony whereof, I have signed my name to this specification.

WALTER A. THUM.